(12) United States Patent
Sable et al.

(10) Patent No.: US 12,001,502 B2
(45) Date of Patent: Jun. 4, 2024

(54) COMMON FRAGMENT CACHING FOR WEB DOCUMENTS

(71) Applicant: ServiceNow, Inc., Santa Clara, CA (US)

(72) Inventors: Kapeel Sharadrao Sable, San Diego, CA (US); Bojan Beran, San Diego, CA (US); Carl David Solis, Chicago, IL (US)

(73) Assignee: ServiceNow, Inc., Santa Clara, CA (US)

( * ) Notice: Subject to any disclaimer, the term of this patent is extended or adjusted under 35 U.S.C. 154(b) by 256 days.

(21) Appl. No.: 17/573,226

(22) Filed: Jan. 11, 2022

(65) Prior Publication Data
US 2023/0222171 A1    Jul. 13, 2023

(51) Int. Cl.
  *G06F 7/00*    (2006.01)
  *G06F 16/957*    (2019.01)
  *G06F 40/143*    (2020.01)

(52) U.S. Cl.
  CPC ...... *G06F 16/9574* (2019.01); *G06F 16/9577* (2019.01); *G06F 40/143* (2020.01)

(58) Field of Classification Search
  CPC . G06F 16/9574; G06F 16/9577; G06F 40/143
  USPC ........ 707/704, 706, 722, 707, 709; 709/202, 709/203, 246, 245
  See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |

(Continued)

FOREIGN PATENT DOCUMENTS

| | | |
|---|---|---|
| EP | 0433979 | 6/1991 |
| WO | WO 99/34285 | 7/1999 |

(Continued)

OTHER PUBLICATIONS

Internation Search Report and Written Opinion for PCT/US2022/081045, mailed Apr. 21, 2023.

(Continued)

*Primary Examiner* — Md I Uddin
(74) *Attorney, Agent, or Firm* — McDonnell Boehnen Hulbert & Berghoff LLP

(57) ABSTRACT

A system includes an application configured to: receive, from a client device, a query for a first web page of a plurality of web pages; generate a response including a shared content that is common to a plurality of web pages, a first page-specific content that defines the first web page, and a predefined token separating the shared content from the first page-specific content; and transmit, to the client device, the response. Reception of the response is configured to cause the client device to: write, to a cache memory, the shared content, render the first web page based on the response, and in response to reception of a subsequent event that references a second web page, read the shared content from the cache memory and begin rendering the shared content before receiving, from the server application, a second page-specific content that defines the second web page.

20 Claims, 13 Drawing Sheets

(56) References Cited

U.S. PATENT DOCUMENTS

| | | | |
|---|---|---|---|
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,041,764 B1 | 10/2011 | Albani et al. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0192300 A1 | 8/2007 | Reuther et al. |
| 2007/0288389 A1 | 12/2007 | Vaughan et al. |
| 2008/0071776 A1 | 3/2008 | Cho et al. |
| 2008/0133289 A1 | 6/2008 | Armour et al. |
| 2008/0148253 A1 | 6/2008 | Badwe et al. |
| 2008/0172620 A1* | 7/2008 | Yoshimura ............ G06F 16/958 707/E17.116 |
| 2008/0319779 A1 | 12/2008 | Hughes et al. |
| 2009/0088875 A1 | 4/2009 | Baier et al. |
| 2009/0228984 A1 | 9/2009 | Sterin |
| 2009/0262741 A1* | 10/2009 | Jungck ................ H04L 41/5054 370/392 |
| 2010/0110932 A1 | 5/2010 | Doran et al. |
| 2018/0123940 A1 | 5/2018 | Rimar et al. |
| 2019/0104398 A1 | 4/2019 | Owen et al. |
| 2019/0310986 A1 | 10/2019 | Wang et al. |
| 2020/0050689 A1 | 2/2020 | Tal et al. |
| 2020/0204443 A1 | 6/2020 | Bar Oz et al. |
| 2021/0194764 A1 | 6/2021 | Badyan et al. |
| 2023/0083822 A1* | 3/2023 | Wu ..................... G06F 16/9574 707/722 |

FOREIGN PATENT DOCUMENTS

| | | |
|---|---|---|
| WO | WO 00/52559 | 9/2000 |
| WO | WO 01/79970 | 10/2001 |
| WO | 1607824 | 12/2005 |

OTHER PUBLICATIONS

"HTTP caching," MDN Web Docs, https://developer.mozilla.org/en-US/docs/Web/HTTP/Caching, printed from the World Wide Web, Jan. 11, 2022.

Matt Gaunt, "Service Workers: an Introduction," Web Fundamentals, Google Developers, https://developers.google.com/web/fundamentals/primers/service-workers, printed from the World Wide Web, Jan. 11, 2022.

* cited by examiner

COMMON FRAGMENT CACHING FOR WEB DOCUMENTS

BACKGROUND

The quality of a user's experience with a web-based software application (e.g., a web page accessed by way of a web browser or a native software application) may depend on how quickly the web-based software application responds to the user's inputs. Specifically, the quality of the user's experience may be improved by decreasing (i) a time it takes the software application to provide a partial rendering that is responsive to a user input (i.e., a start render time) and/or (ii) a time it takes the software application to provide a complete rendering that is responsive to the user input (i.e., a complete render time).

SUMMARY

A server application may be configured to provide a plurality of web pages. A user's perceived responsiveness of the server device may depend on how quickly a client device is able to display at least a partial rendering of a given web page of the plurality of web pages. In some cases, the start render time of the client device may be improved by caching at least part of the given web page on the client device. However, the perceived responsiveness of the given web page may nevertheless remain degraded when the cache is initially populated (i.e., due to the cache initially being empty) and/or updated over time (i.e., due to the cache being stale). This may be especially apparent when caching is performed on a per web page basis. Additionally, caching on a per web page basis may be inefficient with respect to the storage resources of the client device, since each web page may use the storage resources for its corresponding cached data.

Accordingly, the plurality of web pages may be structured to allow programmatic content to be cached and reused across the plurality of web pages (i.e., on a per web page group basis), rather than on a per web page basis. Specifically, each respective web page of the plurality of web pages may include a shared programmatic content, a corresponding page-specific programmatic content, and a predefined token separating the shared programmatic content from the page-specific programmatic content. The shared programmatic content may be common to the plurality of web pages, while the page-specific programmatic content may differ across the plurality of web pages. For example, the shared programmatic content may define an application framework that has been used to construct each of the plurality of web pages, while the page-specific programmatic content may represent the specific usage of components of the application framework to define a corresponding web page.

Thus, when the client device initially obtains one of the plurality of web pages, the shared programmatic content may be cached, and subsequent queries for any of the plurality of web pages may be at least partially satisfied using the cached shared programmatic content. Specifically, while waiting for the server device to respond, the client device may begin rendering a given web page of the plurality of web pages based on the shared programmatic content retrieved from the cache. Thus, in some cases, the user may be provided with a partial rendering of the given web page before the client device receives a response from the server device. The client device may subsequently complete the rendering of the given web page after receiving, from the server device, the page-specific programmatic content for the given web page. Since the given web page is at least partially rendered by the time the page-specific programmatic content is received, the complete rendering may be displayed sooner than it would otherwise be displayable if the shared programmatic content was not cached.

Accordingly, for a group of n web pages that each include the shared programmatic content, the user might experience a degradation in the perceived response only once (i.e., when first requesting one of the plurality of web pages), rather than up to n times (i.e., when first requesting each of the plurality of web pages). Similarly, when the shared programmatic content is updated over time, the user might again experience a degradation in the perceived response only once per update, rather than up to n times per update.

Additionally, structuring the plurality of web pages in this manner allows both cacheable and non-cacheable programmatic content for a given web page to be obtained using as few as one query using one server interface. That is, the client device might not need to make separate requests for the cacheable shared programmatic content and the non-cacheable page-specific programmatic content, thereby reducing the number of calls to the server interface. Additionally, using one server interface for obtaining both cacheable and non-cacheable programmatic content may reduce the amount of maintenance and/or updates performed each time a change is made to the server interface and/or the programmatic content.

Accordingly, a first example embodiment may involve a system that includes a persistent storage configured to store programmatic content that defines a plurality of web pages. The programmatic content may include: (i) a shared programmatic content that is common to the plurality of web pages, and (ii) for each respective web page of the plurality of web pages, a corresponding page-specific programmatic content that defines the respective web page. The system may also include a processor and a server application configured to perform, when executed by the processor, operations. The operations may include receiving, from a client device, a query for a first web page of the plurality of web pages. The operations may also include generating, in response to reception of the query, a response that includes the shared programmatic content, a first page-specific programmatic content that defines the first web page, and a predefined token separating the shared programmatic content from the first page-specific programmatic content. The operations may further include transmitting, to the client device, the response. Reception of the response may be configured to cause the client device to: (i) write, to a cache memory of the client device, the shared programmatic content, (ii) render, for display on a user interface, the first web page based on the shared programmatic content and the first page-specific programmatic content, and (iii) in response to reception of a subsequent event that references a second web page of the plurality of web pages, read the shared programmatic content from the cache memory and begin rendering the shared programmatic content for display on the user interface before receiving, from the server application, a second page-specific programmatic content that defines the second web page.

A second example embodiment may involve a method that includes receiving, by a server application and from a client device, a query for a first web page of a plurality of web pages. A persistent storage may be configured to store programmatic content that defines the plurality of web pages. The programmatic content may include: (i) a shared programmatic content that is common to the plurality of web pages, and (ii) for each respective web page of the plurality of web pages, a corresponding page-specific programmatic content that defines the respective web page. The method may also include generating, by the server application and in response to reception of the query, a response that includes the shared programmatic content, a first page-specific programmatic content that defines the first web page, and a predefined token separating the shared programmatic content from the first page-specific programmatic content. The method may further include transmitting, by the server application and to the client device, the response. Reception of the response may be configured to cause the client device to: (i) write, to a cache memory of the client device, the shared programmatic content, (ii) render, for display on a user interface, the first web page based on the shared programmatic content and the first page-specific programmatic content, and (iii) in response to reception of a subsequent event that references a second web page of the plurality of web pages, read the shared programmatic content from the cache memory and begin rendering the shared programmatic content for display on the user interface before receiving, from the server application, a second page-specific programmatic content that defines the second web page.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

A sixth example embodiment may involve a system that includes a cache memory, a processor, and a client application configured to perform, when executed by the processor, operations. The operations may include transmitting, to a server device, a query for a first web page of a plurality of web pages. The plurality of web pages may be defined using programmatic content that may include: (i) a shared programmatic content that is common to the plurality of web pages, and (ii) for each respective web page of the plurality of web pages, a corresponding page-specific programmatic content that defines the respective web page. The operations may also include receiving, from the server device, a response that includes the shared programmatic content, a first page-specific programmatic content that defines the first web page, and a predefined token separating the shared programmatic content from the first page-specific programmatic content. The operations may additionally include, based on receiving the response, writing, to the cache memory, the shared programmatic content and rendering, for display on a user interface, the first web page based on the shared programmatic content and the first page-specific programmatic content. The operations may further include, in response to reception of a subsequent event that references a second web page of the plurality of web pages, reading the shared programmatic content from the cache memory and beginning rendering the shared programmatic content for display on the user interface before receiving, from the server device, a second page-specific programmatic content that defines the second web page.

A seventh example embodiment may involve a method that includes transmitting, by a client application and to a server device, a query for a first web page of a plurality of web pages. The plurality of web pages may be defined using programmatic content that may include: (i) a shared programmatic content that is common to the plurality of web pages, and (ii) for each respective web page of the plurality of web pages, a corresponding page-specific programmatic content that defines the respective web page. The method may also include receiving, by the client application and from the server device, a response that includes the shared programmatic content, a first page-specific programmatic content that defines the first web page, and a predefined token separating the shared programmatic content from the first page-specific programmatic content. The method may additionally include, based on receiving the response, writing, by the client application and to a cache memory, the shared programmatic content and rendering, by the client application and for display on a user interface, the first web page based on the shared programmatic content and the first page-specific programmatic content. The method may further include, in response to reception of a subsequent event that references a second web page of the plurality of web pages, reading, by the client application, the shared programmatic content from the cache memory and beginning rendering, by the client application, the shared programmatic content for display on the user interface before receiving, by the client application and from the server device, a second page-specific programmatic content that defines the second web page.

In an eighth example embodiment, an article of manufacture may include a non-transitory computer-readable medium, having stored thereon program instructions that, upon execution by a computing system, cause the computing system to perform operations in accordance with the sixth and/or seventh example embodiment.

In a ninth example embodiment, a computing system may include at least one processor, as well as memory and program instructions. The program instructions may be stored in the memory, and upon execution by the at least one processor, cause the computing system to perform operations in accordance with the sixth and/or seventh example embodiment.

In a tenth example embodiment, a system may include various means for carrying out each of the operations of the sixth and/or seventh example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
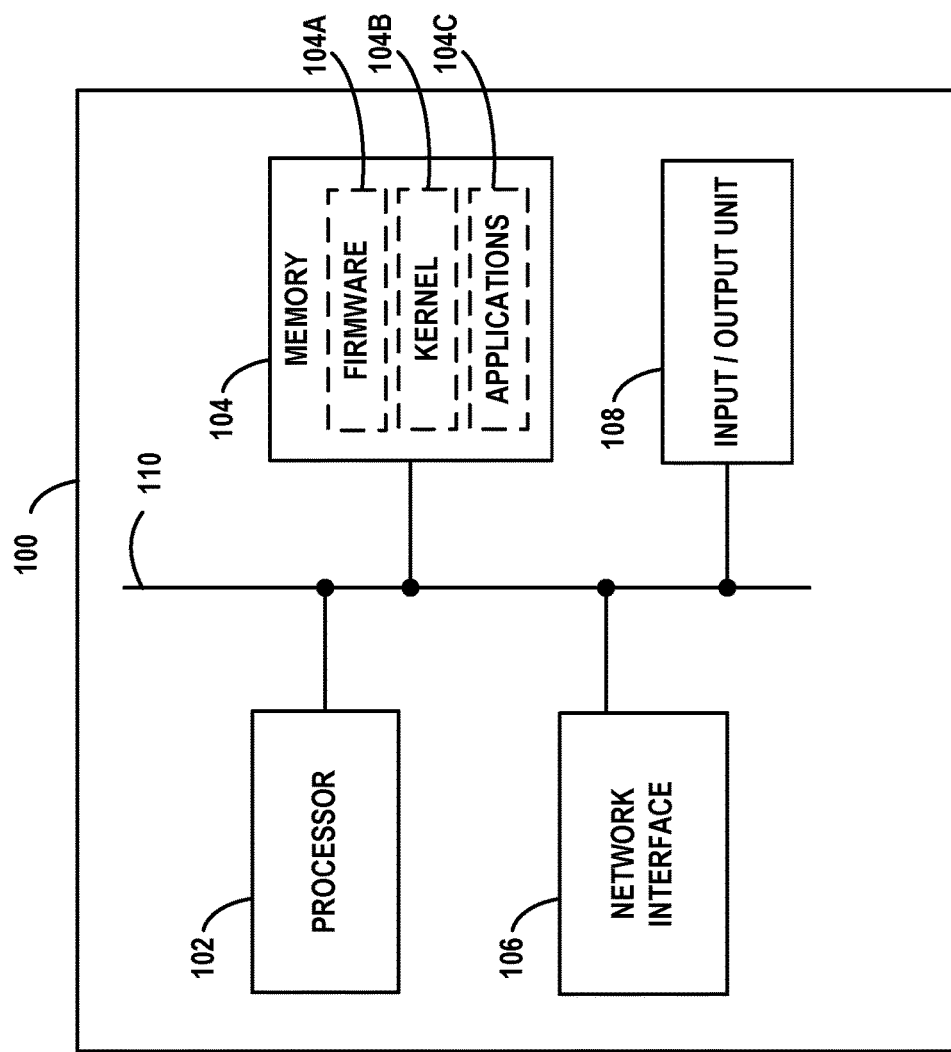
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
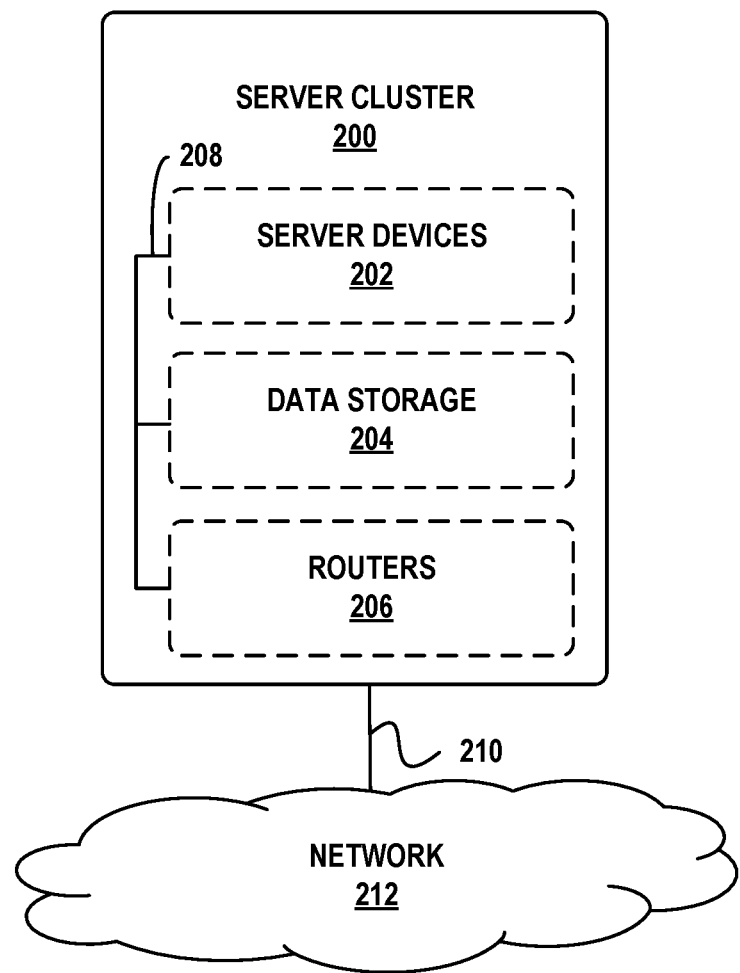
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
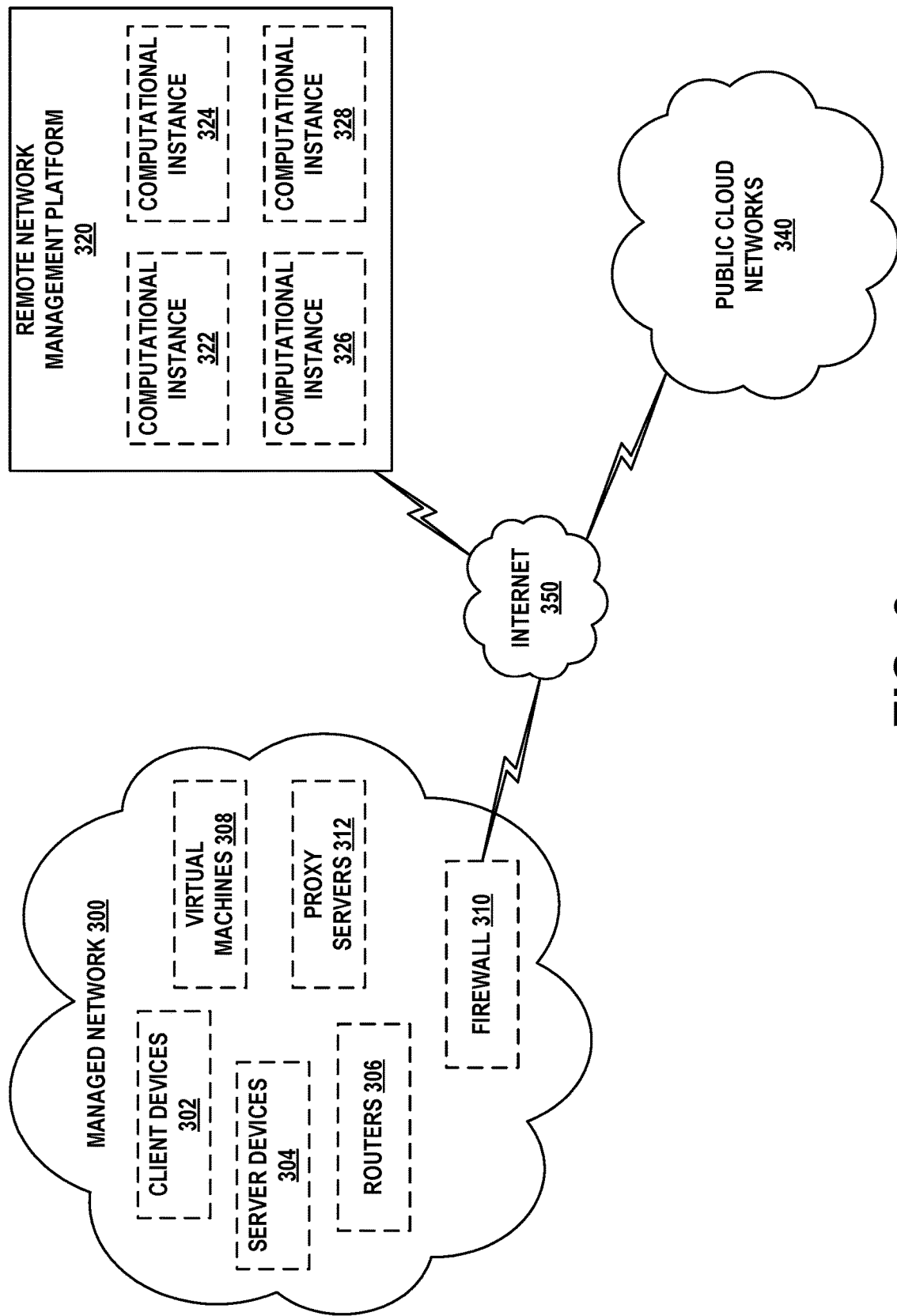
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
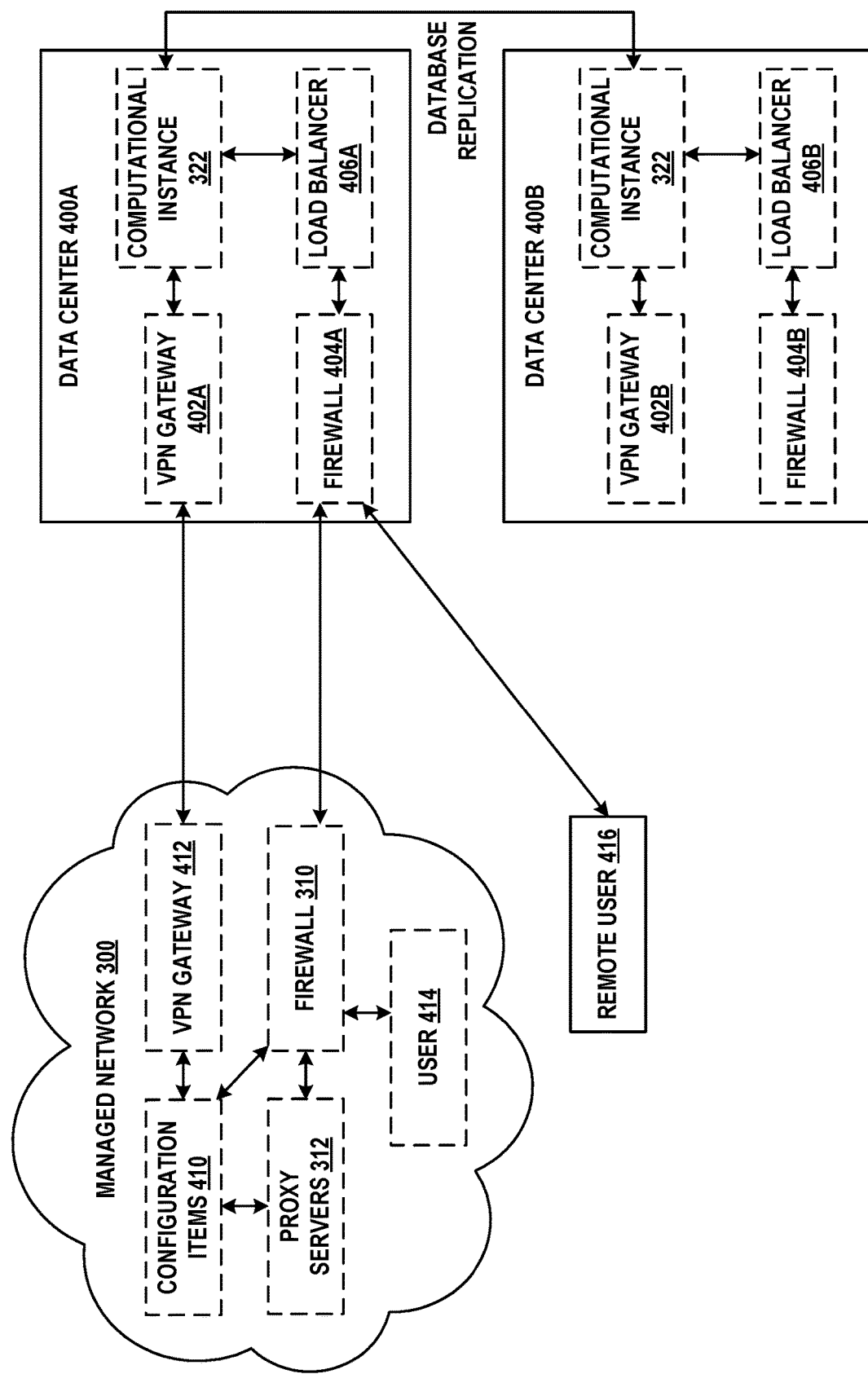
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
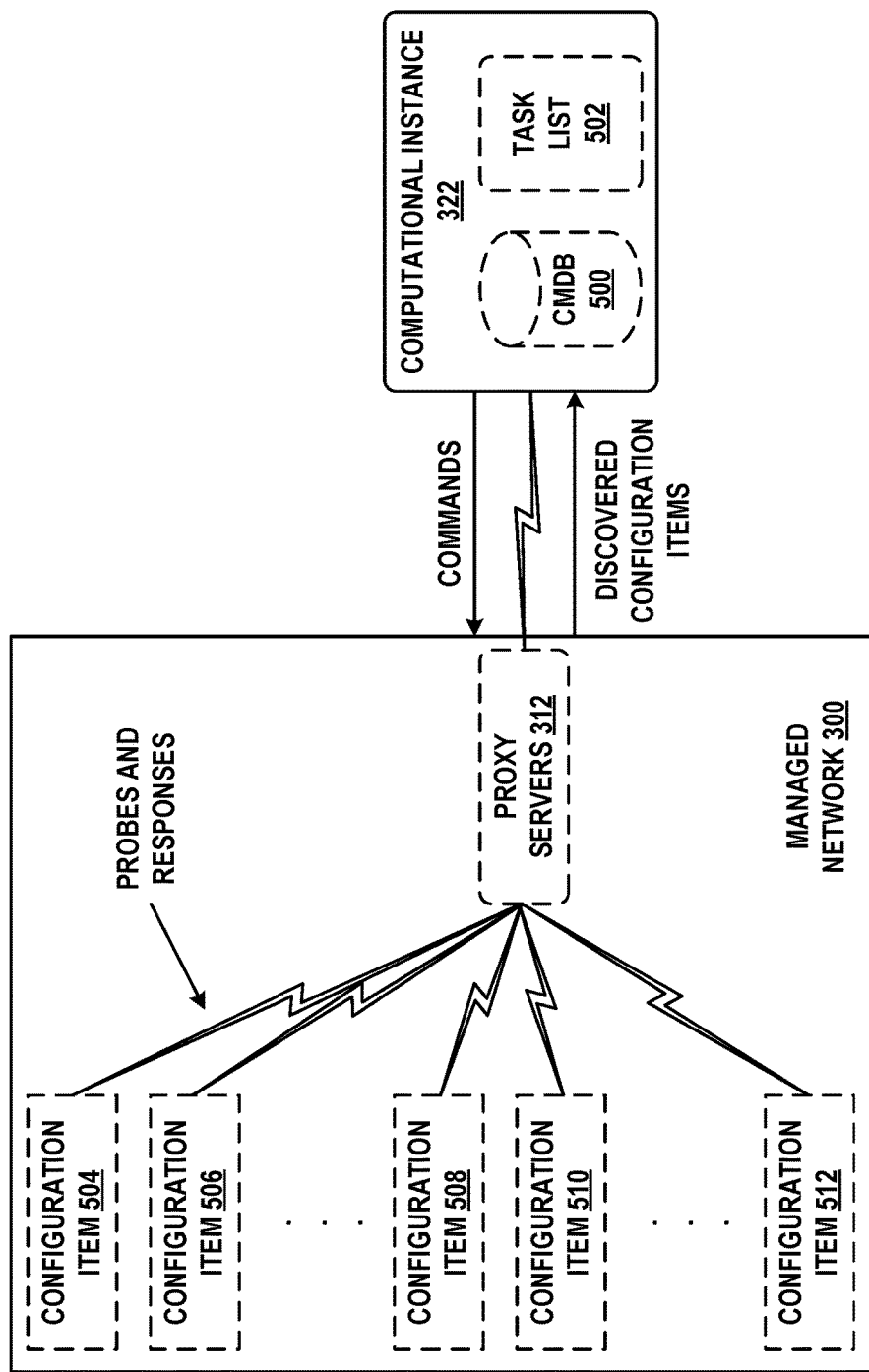
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
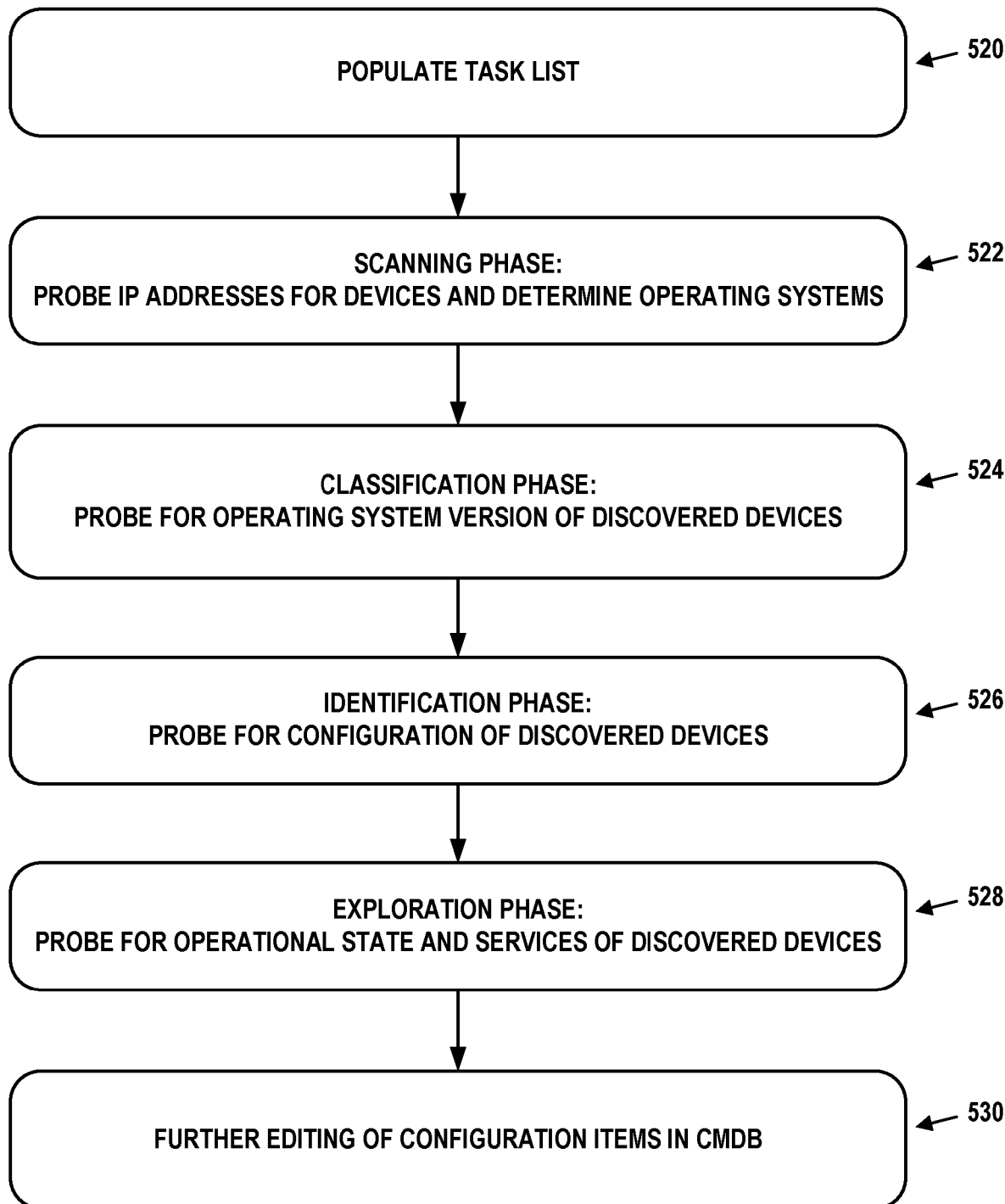
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Arrangements of Programmatic Contents of Web Pages

The quality of a user's experience with a web-based software application may be improved by decreasing a start render time and/or a complete render time of web pages provided by the web-based software application. The start render time and/or the complete render time may be improved by caching parts of the web pages on a client device executing the web-based software application. However, the benefit of caching may be limited when caching is performed on a per-page basis, rather than for a plurality of web pages, and/or when caching involves multiple server calls. Accordingly, the plurality of web pages, or subsets thereof, may be structured such that programmatic content cached with respect to one web page of the plurality of web pages is reusable for multiple web pages of the plurality of web pages.

Figure 6:
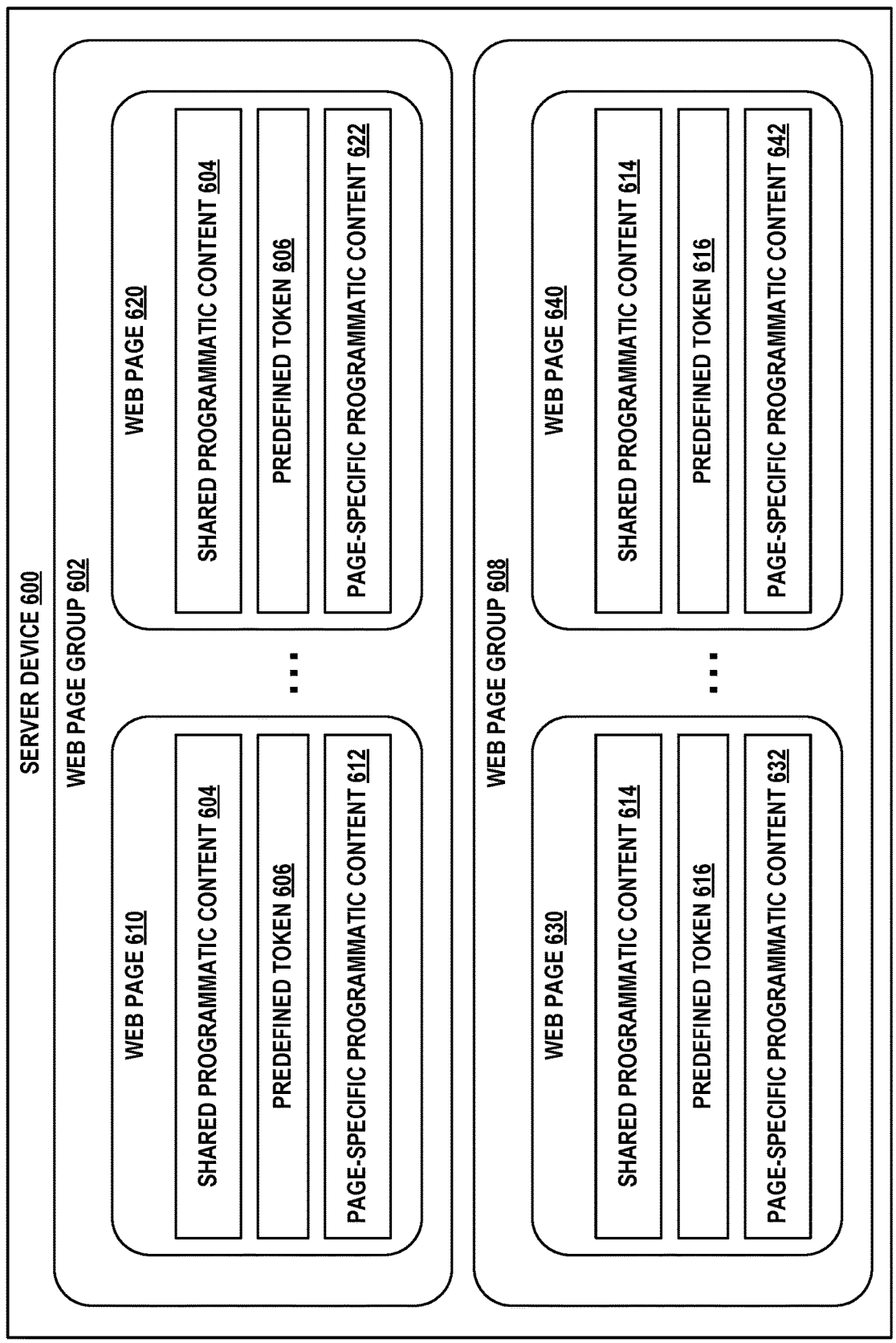
FIG. 6 depicts web page groups provided by a server device, in accordance with example embodiments.

FIG. 6 illustrates server device 600 that may be configured to provide programmatic content of a plurality of web pages that are structured in a manner that facilitates caching aspects thereof on the client device. Specifically, server device 600 may be configured to provide programmatic content for web pages 610 through web page 620 (i.e., web pages 610-620), which may form web page group 602, and web page 630 through web page 640 (i.e., web pages 640-640), which may form web page group 608. In some cases, the plurality of web pages provided by server device 600 may be arranged into more or fewer web page groups than shown in FIG. 6.

Each respective web page of web pages 610-620 and 630-640 may include a corresponding shared programmatic content, a corresponding page-specific programmatic content, and a corresponding predefined token separating the corresponding shared programmatic content from the corresponding page-specific programmatic content. For example, web page 610 may include shared programmatic content 604, page-specific programmatic content 612, and predefined token 606 therebetween. Web page 620 may include shared programmatic content 604, page-specific programmatic content 622, and predefined token 606 therebetween. Web page 630 may include shared programmatic content 614, page-specific programmatic content 632, and predefined token 616 therebetween. Web page 640 may include shared programmatic content 614, page-specific programmatic content 642, and predefined token 616 therebetween.

Thus, each respective web page in web page group 602 may include the same shared programmatic content 604 and predefined token 606, and a different respective page specific-programmatic content. Thus, shared programmatic content 604, once cached by the client device, may be reused across any web page in web page group 602. In some implementations, predefined token 606 may operate to (i) separate shared programmatic content 604 from the page-specific programmatic content of a given web page and (ii) indicate that the given web page is part of web page group 602 associated with shared programmatic content 604. Similarly, each respective web page in web page group 608 may include the same shared programmatic content 614 and predefined token 616, and a different respective page specific-programmatic content. Thus, shared programmatic content 614, once cached by the client device, may be reused across any web page in web page group 608. In some implementations, predefined token 616 may operate to (i) separate shared programmatic content 614 from the page-specific programmatic content of a given web page and (ii) indicate that the given web page is part of web page group 608 associated with shared programmatic content 614.

In some embodiments, the predefined token of a web page group may vary to some extent between different web pages within the web page group. For example, the predefined token may have a common string of characters that identifies the web page group in some fashion, as well as another string that is potentially different for each web page within the web page group (e.g., a timestamp or web page identifier).

The programmatic content of a given web page may include web page markup language content (e.g., instructions written using HTML, XML, etc.), style sheet language content (e.g., instructions written using Cascading Style Sheets), and/or a scripting language content (e.g., instructions written using JAVASCRIPT®). That is, the programmatic content of the given web page may include software instructions that, when executed by the client device, cause the client device to render and display the given web page, and cause components thereof to behave in predetermined ways in response to user input.

The predefined token may operate as a cache marker that delineates the cacheable shared programmatic content from the non-cacheable page-specific programmatic content. The predefined token may, for example, take the form of a comment (e.g., an HTML comment). Thus, the predefined token might not define a renderable and/or displayable part of a given web page, but may be interpretable by, for example, a service worker of a client application to delineate the cacheable parts of the given web page from the non-cacheable parts of the given web page. In some implementations, the predefined token might be interpretable only by the service worker, but might not be usable by other components of the client application. Thus, the caching operations for the shared programmatic content, as described herein, may be performed in addition to and/or independently of other caching operations that might conventionally be performed by the client application, server application, and/or any other intermediate devices by way of which the client application and the server application communicate with one another.

In some implementations, the shared programmatic content may define at least part of an application framework (e.g., provided by the aPaaS) using which a corresponding web page group was constructed, while the page-specific programmatic content may define a specific implementation of the respective web page using components of the application framework. The application framework may provide, for example, common visual style(s) and/or behavior(s) of user interface components, which may be composed in various ways to define a plurality of different web pages provided by server device 600. In some cases, web pages 610-620 in web page group 602 may use a first subset of the application framework, as defined by shared programmatic content 604, while web pages 630-640 in web page group 608 may use a second subset of the application framework, as defined by shared programmatic content 614. In other cases, web pages 610-620 in web page group 602 may use a first application framework, as defined by shared programmatic content 604, while web pages 630-640 in web page group 608 may use a second application framework, as defined by shared programmatic content 614, that is different from the first application framework.

VI. Example Cache Writing

Figure 7A:
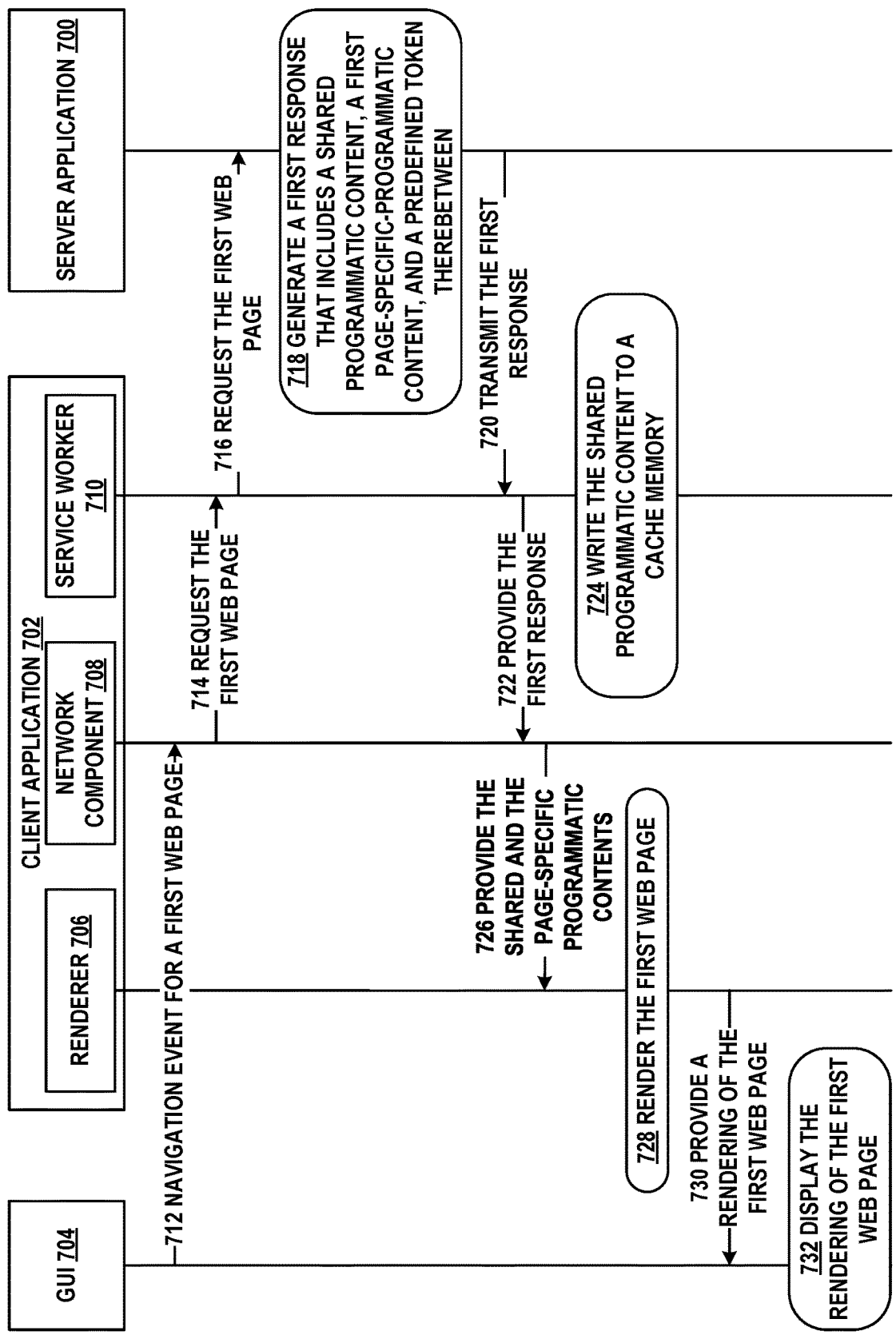
FIGS. 7A, 7B, 7C, and 7D depict a message flow diagram, in accordance with example embodiments.

FIG. 7A contains a message flow diagram that illustrates various operations associated with writing shared programmatic content to a cache memory of a client device. Specifically, the client device may include GUI 704 and client application 702. Client application 702 may include renderer 706, network component 708, and service worker 710. Client application 702 may be configured to communicate with server application 700, which may be executed by a server device, to obtain programmatic content for one or more of a plurality of web pages. For example, client application 702 may be a web browser application or a native software application. The client device may be, for example, computing device 100, which may be disposed within managed network 300. The server device may be, for example, server cluster 200, which may form part of a computational instance of remote network management platform 320.

Renderer 706 may be configured to generate visual representations of web pages based on corresponding programmatic content. GUI 704 may be configured to display the visual representations of the web pages. Network component 708 may be configured to generate queries for the programmatic content, transmit such queries to server application 700 and/or service worker 710, and receive corresponding responses from server application 700 and/or service worker 710.

Service worker 710 may be configured to monitor the communications between network component 708 and server application 700, and manage the cache memory of client application 702 based on these communications. Thus, service worker 710 may, in some implementations, be referred to as a network edge proxy. Service worker 710 may be deployed on client application 702 as part of an initialization procedure. For example, server application 700 may be configured to transmit, to client application 702, initialization instructions that define service worker 710, thereby configuring client application 702 to utilize the predefined token as part of caching operations. The initialization procedure may be carried out, for example, when client application 702 transmits, for the first time, a request for a web page to server application 700, and/or when manually requested by a user, among other possibilities.

The shared programmatic content of a plurality of web pages may be stored in the cache memory of the client device based on receiving a navigation event associated with a first web page of the plurality of web pages. Specifically, GUI 704 may be configured to provide, to network component 708, a navigation event for the first web page, as indicated by arrow 712. For example, the navigation event at arrow 712 may be generated based on and/or in response to a user selecting and/or specifying the first web page by way of GUI 704 (e.g., by typing in an address of the first web page, by clicking a link to the first web page, reloading the first web page, etc.). Based on and/or in response to reception of the navigation event at arrow 712, network component 708 may be configured to transmit, to service worker 710, a first query for the first web page, as indicated by arrow 714. Based on and/or in response to reception of the first query at arrow 714, service worker 710 may be configured to forward the first query to server application 700, as indicated by arrow 716.

Based on and/or in response to reception of the first query at arrow 716, server application 700 may be configured to generate a first response that includes (i) a shared programmatic content, (ii) a first page-specific programmatic content of the first web page, and (iii) a predefined token separating the shared programmatic content from the first page-specific programmatic content, as indicated by block 718. For example, the first web page may be web page 630, and the first response may thus include shared programmatic content 614 and page-specific programmatic content 632 separated by predefined token 616.

Based on and/or in response to generating the first response at block 718, server application 700 may be configured to transmit, to client application 702, the first response, which may be received by service worker 710, as indicated by arrow 720. In some implementations, a given response from server application 700 may be divided into two or more chunks, which may be sequentially provided to client application 702. Accordingly, at least some of the operations discussed herein may be performed based on and/or in response to generation, transmission, and/or reception of one or more chunks of the given response.

Based on and/or in response to reception of the first response, service worker 710 may be configured to provide the first response to network component 708, as indicated by arrow 722. Additionally, based on and/or in response to reception of the first response, service worker 710 may be configured to write the shared programmatic content to the cache memory of the client device, as indicated by block 724.

For example, service worker 710 may be configured to parse the first response to identify therein the predefined token. Based on and/or in response to identifying the predefined token in the first response, service worker 710 may be configured to write, to the cache memory, the programmatic content that precedes the predefined token (i.e., the shared programmatic content), but might not be configured to write, to the cache memory, the programmatic content that follows the predefined token (i.e., the page-specific programmatic content). The operations of block 724 may be executed while the cache memory does not yet have stored therein the shared programmatic content. Once the cache memory is populated with the shared programmatic content, commensurate operations might not be carried out based on and/or in response to reception of responses from server application 700 that also contain the same shared programmatic content.

In implementations where web pages provided by server application 700 are part of multiple different web page groups, each of which uses different shared programmatic content, service worker 710 may also be configured to write, to the cache memory, the predefined token. Thus, the predefined token may subsequently be used to select an appropriate shared programmatic content for a given web page, based on the web page group to which the given web page belongs. In implementations where all web pages provided by server application 700 are part of the same web page group, and thus include the same shared programmatic content, service worker 710 might not be configured to write the predefined token to the cache memory.

Based on and/or in response to reception of the first response at arrow 722, network component 708 may be configured to provide, to renderer 706, the shared programmatic content and the page-specific programmatic content, as indicated by arrow 726. Based on and/or in response to reception of the shared and page-specific programmatic contents at arrow 726, renderer 706 may be configured to render the first web page, as indicated by block 728. Rendering the first web page may involve parsing the shared and page-specific programmatic contents and generating a visual representation of the first web page based thereon, among other operations. Based on and/or in response to completion of rendering of the first web page at block 728, renderer 706 may be configured to provide a rendering of the first web page to GUI 704, as indicated by arrow 730. Based on and/or in response to reception of the rendering of the first web page at arrow 730, GUI 704 may be configured to display the rendering of the first web page, as indicated by block 732.

Thus, the operations of FIG. 7A may allow client application 702 to cache the shared programmatic content of the first web page, thereby allowing this shared programmatic content to be reused in response to subsequent navigation events associated with any web page that also uses the shared programmatic content, and thus belongs to the same web page group as the first web page. Notably, since the cache memory does not contain the shared programmatic content prior to reception of the first response, rendering of the first web page may be completely dependent on reception of the first response from server application 700. That is, rendering of the first web page may begin only after the first response is received at arrow 722, and thus the start render time thereof might not be improved. However, start render time of any web page that belongs to the same web page group as the first web page may be improved by utilizing the shared programmatic content now stored in the cache memory.

VII. Example Cache Reading

Figure 7B:
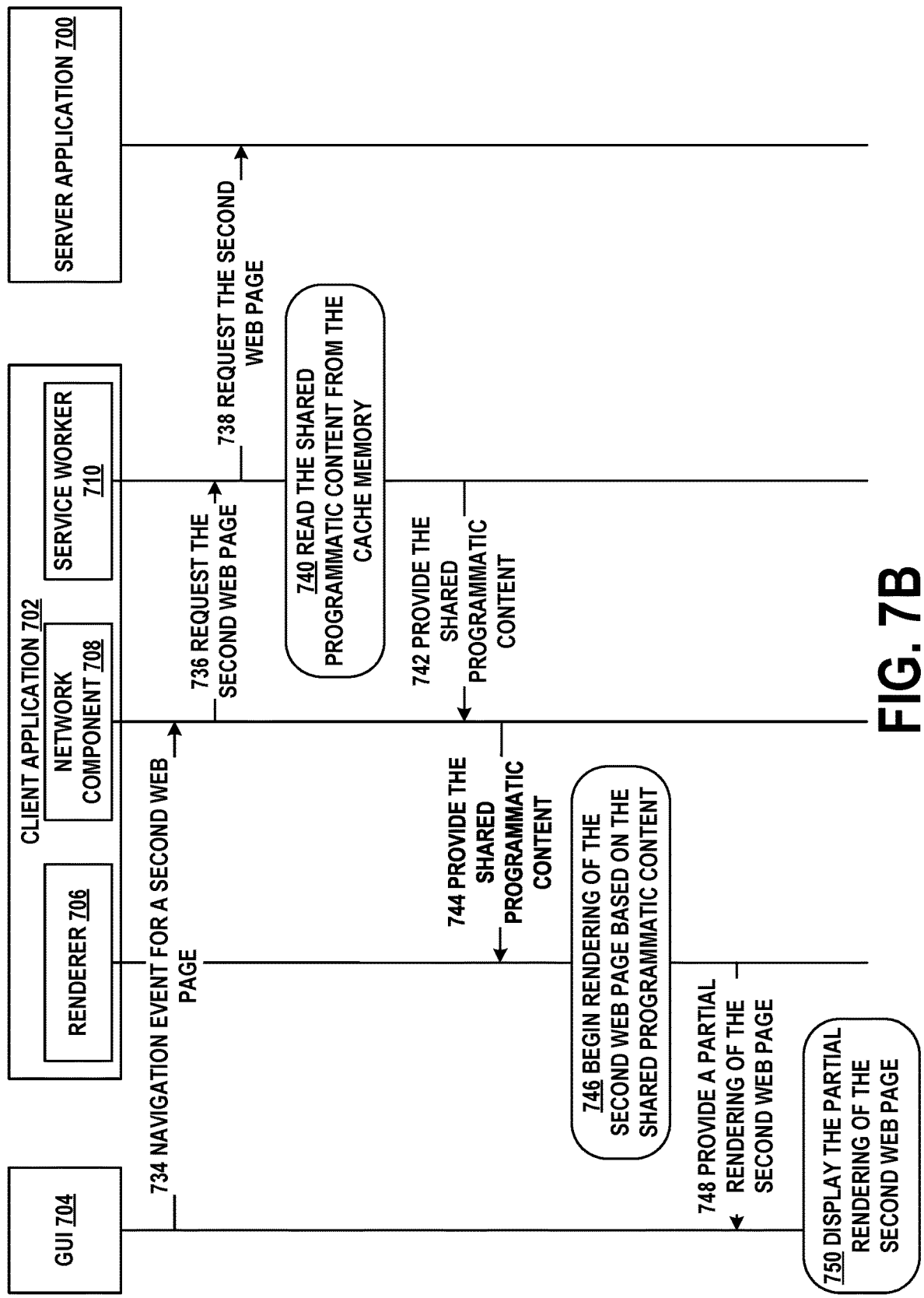
Figure 7C:
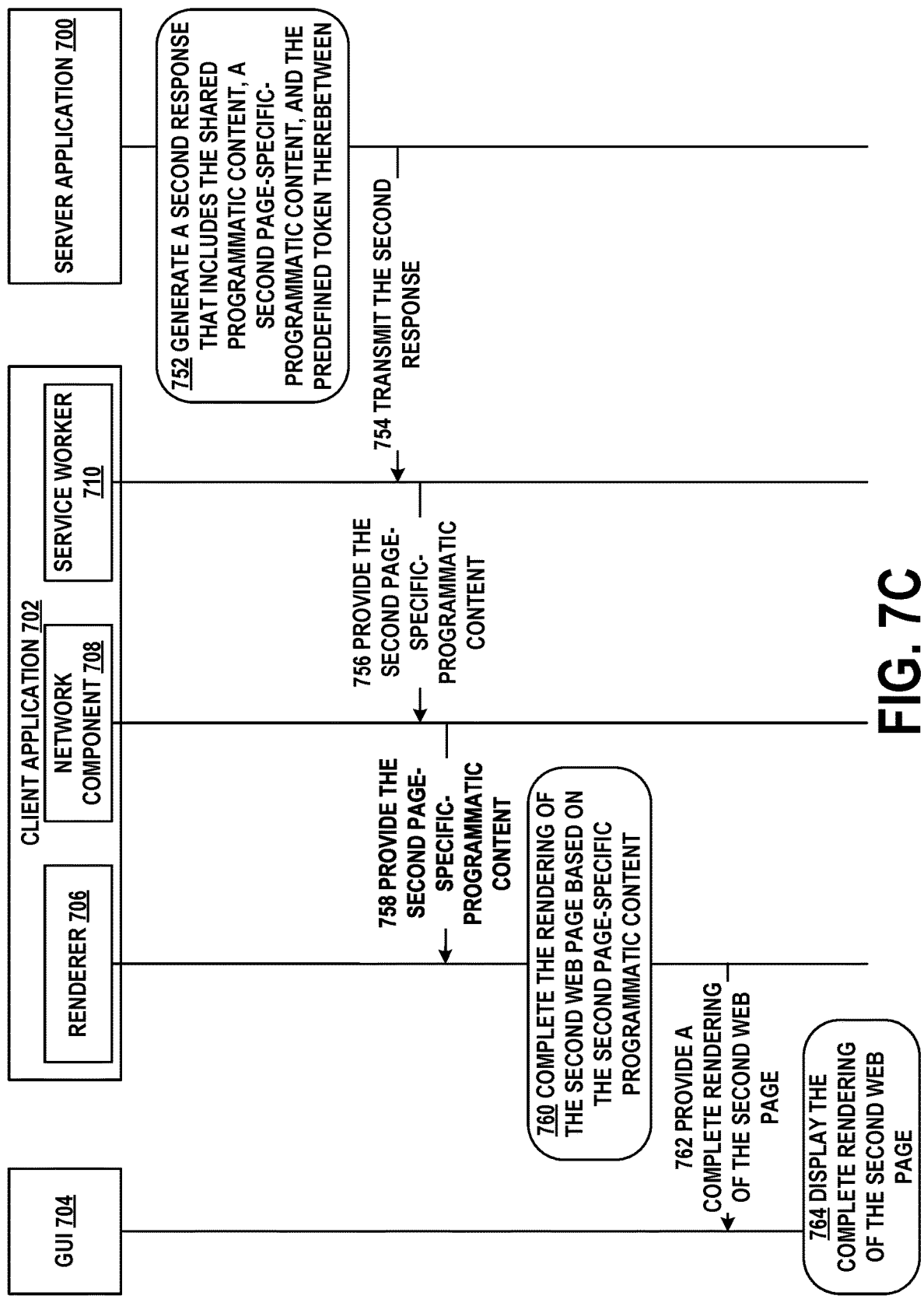

FIGS. 7B and 7C contain respective message flow diagrams that illustrate various operations associated with reading shared programmatic content from the cache memory of the client device. Specifically, GUI 704 may be configured to provide, to network component 708, a navigation event for a second web page, as indicated by arrow 734. The navigation event at arrow 734 may be similar to the navigation event at arrow 712. The second web page may belong to the same web page group as the first web page, and may thus include the same shared programmatic content as the first web page. For example, the first web page may be web page 630 and the second web page may be web page 640. The first and second web pages may thus each include shared programmatic content 614. Based on and/or in response to reception of the navigation event at arrow 734, network component 708 may be configured to transmit, to service worker 710, a second query for the second web page, as indicated by arrow 736.

Based on and/or in response to reception of the second query at arrow 736, service worker 710 may be configured to forward the second query to server application 700, as indicated by arrow 738. Additionally, based on and/or in response to reception of the second query at arrow 736, service worker 710 may be configured to read the shared programmatic content from the cache memory, as indicated by block 740. Although FIG. 7B illustrates arrow 738 preceding block 740, in some implementations, the operations of block 740 (and possibly one or more of the other operation subsequent to block 740) may be executed before the operations of arrow 738 and/or in parallel therewith. For example, service worker 710 may be configured to use (i) a first thread of the client device to perform the operations of one or more of block 740, arrow 742, arrow 744, block 746, arrow 748, and/or block 750, and (ii) a second thread of the client device to perform one or more of the operations of arrow 738 and/or the operations shown in FIG. 7C.

Service worker 710 may be configured to read the shared programmatic content from the cache memory based on determining that the second web page is one of a plurality of web pages that uses the same shared programmatic content as the first web page. For example, service worker 710 may be configured to read shared programmatic content 604 from the cache memory based on determining that web page 640 is part of web page group 608.

In one example, service worker 710 may be configured to determine that the second web page is one of the plurality of web pages that uses a previously-cached shared programmatic content based on a URL of the second web page. For example, web pages 630-640 of web page group 608 may each include a common domain, subdomain, path, and/or parameter, among other possibilities, that uniquely identifies web page group 608. Alternatively or additionally, web page groups 602 and 608, and the web pages corresponding thereto, may be identified as part of the initialization instructions that deploy service worker 710 on client application 702. For example, the initialization instructions may include a mapping of a corresponding URL of each of web pages 610-620 and 630-640 to a corresponding web page group and/or predefined token.

In another example, service worker 710 may be configured to determine that the second web page is one of the plurality of web pages by determining that a prior response received from server application 700 in response to a prior query for the second web page included the predefined token (e.g., predefined token 616). Thus, a response to an initial query for a given web page may be used to determine the corresponding web page group to which the given web page belongs, and subsequent queries for the given web page may be facilitated using the shared programmatic content that has been cached for the corresponding web page group.

Based on and/or in response to reading of the shared programmatic content at block 740, service worker 710 may be configured to provide the shared programmatic content, to network component 708, as indicated by arrow 742. Based on and/or in response to reception of the shared programmatic content at arrow 742, network component 708 may be configured to provide, to renderer 706, the shared programmatic content, as indicated by arrow 744.

Based on and/or in response to reception of the shared programmatic content at arrow 744, renderer 706 may be configured to begin rendering the second web page, as indicated by block 746, thereby generating a partial rendering of the second web page. Generating the partial rendering of the second web page may involve parsing the shared programmatic content and generating a partial visual representation of the second web page, among other operations. For example, renderer 706 may be configured to generate at least part of a document object model (DOM) of the second web page, load at least some textual, visual, and/or aural content shared by the plurality of web pages, load and/or interpret at least part of the scripts that define at least part of a behavior of components of the plurality of web pages, and/or generate one or more UI components that are common to the plurality of web pages, among other possibilities. Some of the UI components may be complete in that these complete UI components might not necessitate further modifications based on the page-specific programmatic content of the second web page, while other UI components may be partial in that these partial UI components may necessitate at least some modifications based on the page-specific programmatic content of the second web page.

Based on and/or in response to generation of the partial rendering of the second web page at block 746, renderer 706 may be configured to provide the partial rendering of the second web page to GUI 704, as indicated by arrow 748. Based on and/or in response to reception of the partial rendering of the second web page at arrow 748, GUI 704 may be configured to display the partial rendering of the second web page, as indicated by block 750.

Turning to FIG. 7C, based on and/or in response to reception of the second query at arrow 738, server application 700 may be configured to generate a second response that includes (i) the shared programmatic content, (ii) a second page-specific programmatic content of the second web page, and (iii) the predefined token separating the shared programmatic content from the second page-specific programmatic content, as indicated by block 752. For example, the second web page may be web page 640, and the first response may thus include shared programmatic content 614 and page-specific programmatic content 642 separated by predefined token 616.

Based on and/or in response to generating the second response at block 752, server application 700 may be configured to transmit, to client application 702, the second response, which may be received by service worker 710, as indicated by arrow 754. Based on and/or in response to reception of the second response, service worker 710 may be configured to provide the second page-specific programmatic content to network component 708, as indicated by arrow 756. Since the shared programmatic content was previously provided to renderer 706 at arrows 742 and 744, the shared programmatic content contained in the second response may be discarded by service worker 710, and a duplicate thereof thus might not be provided to network component 708.

In some implementations, service worker 710 may be configured to discard the shared programmatic content contained in the second response based on and/or in response to determining that the predefined token contained in the second response matches the predefined token stored in the cache memory in association with the shared programmatic content. When the predefined token contained in the response does not match the predefined token stored in the cache memory, service worker 710 may be configured to update the cache memory based on the response, as shown in and discussed in more detail with respect to FIG. 7D.

Based on and/or in response to reception of the second page-specific programmatic content at arrow 756, network component 708 may be configured to provide, to renderer 706, the second page-specific programmatic content, as indicated by arrow 758. Based on and/or in response to reception of the second page-specific programmatic content at arrow 758, renderer 706 may be configured to complete the rendering of the second web page, as indicated by block 760, thereby generating a complete (rather than partial) rendering of the second web page. Completion of the rendering of the second web page may involve parsing the second page-specific programmatic content and completing generation of the visual representation of the second web page, among other operations. For example, renderer 706 may be configured to complete the DOM of the second web page, load at least some textual, visual, and/or aural content that is specific to the second web page, load and/or interpret at least part of the scripts that define behavior(s) of component(s) that are specific to the second web page, generate one or more UI components that are specific to the second web page, and/or complete generation of one or more partial UI components using data that is specific to the second web page, among other possibilities.

Based on and/or in response to generation of the complete rendering of the second web page at block 760, renderer 706 may be configured to provide the complete rendering of the second web page to GUI 704, as indicated by arrow 762. Based on and/or in response to reception of the complete rendering of the second web page at arrow 762, GUI 704 may be configured to display the complete rendering of the second web page, as indicated by block 764.

GUI 704 may be configured to display the partial rendering of the second web page at block 750 prior to execution of one or more of the operations of FIG. 7C. Thus, a user may be provided with visual feedback responsive to the navigation event of arrow 734 prior to receiving and/or processing the second response of arrow 754. Specifically, a maximum possible time improvement in the start render time provided by caching of the shared programmatic content may be equal to a time between (i) transmitting the second query at arrow 738 and (ii) reception of a first chunk of the second response at arrow 754. That is, the maximum possible improvement in the start render time may be equal to a network response time of server application 700.

In some cases, the operations of block 740 through block 750 may take less time to complete than the operations of block 752 and arrow 754. Thus, the partial rendering may be displayed at block 750 prior to reception of the second response at arrow 754, and thus the actual time improvement in the start render time may be equal to the maximum possible time improvement. In other cases, the operations of block 740 through block 750 may take more time to complete than the operations of block 752 and arrow 754. Thus, the partial rendering may be displayed at block 750 after generation of the second response at block 752 but before reception of the second response at block 752, or after reception of the second response at block 752, and thus the actual time improvement may be smaller than the maximum possible time improvement. In either case, the start render time may be reduced, and thus the user's experience with the second web page may be improved.

VIII. Example Cache Update

Figure 7D:
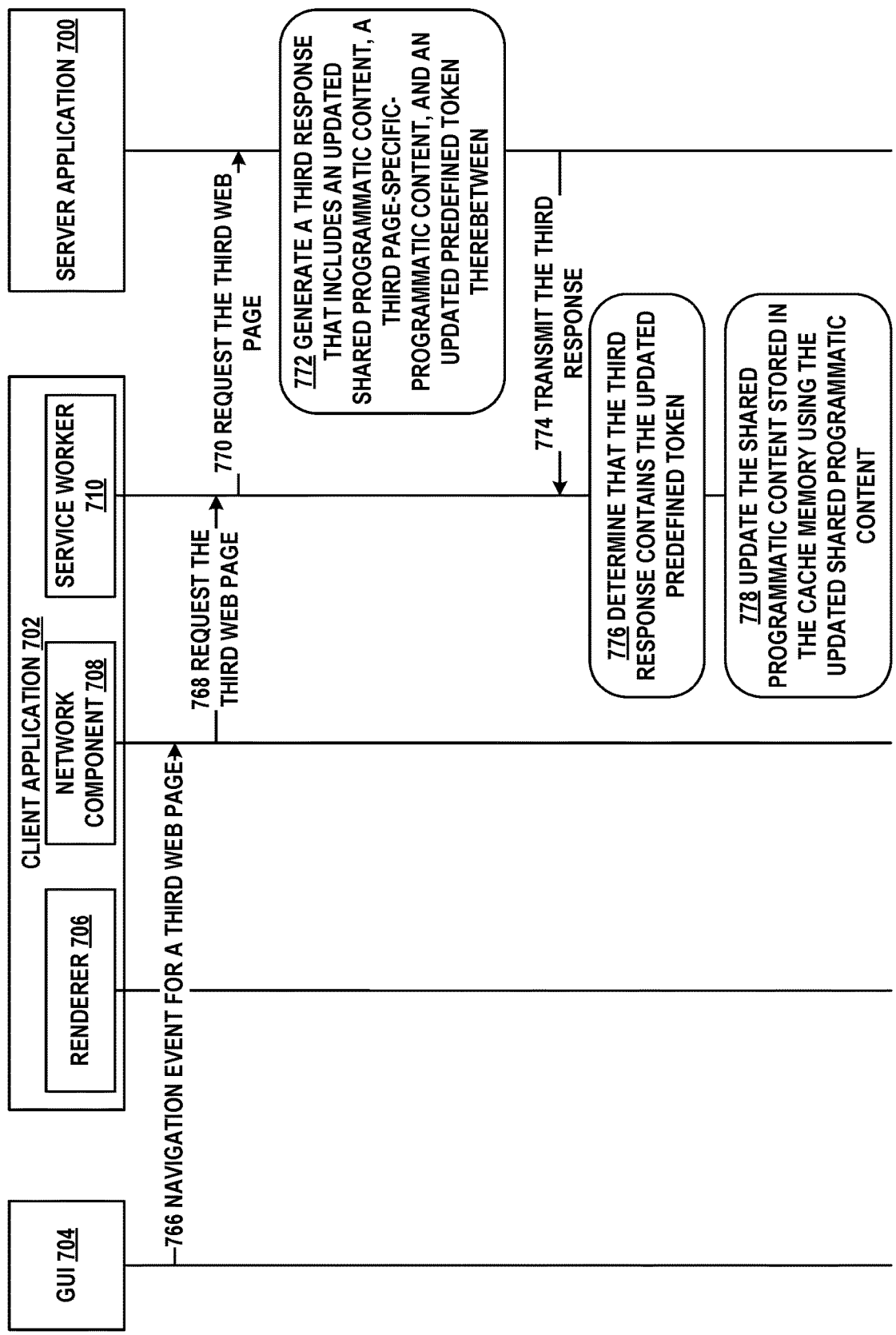

FIG. 7D contains a message flow diagram that illustrates various operations associated with updating the shared programmatic content stored in the cache memory of the client device. Specifically, GUI 704 may be configured to provide, to network component 708, a navigation event for a third web page, as indicated by arrow 766, which may be similar to the navigation event at arrow 712. The third web page may belong to the same web page group as the first web page and the second web page, and may thus include the same shared programmatic content as these web pages. For example, the third web page may be part of web page group 608, and may thus include shared programmatic content 614.

Based on and/or in response to reception of the navigation event at arrow 766, network component 708 may be configured to transmit, to service worker 710, a third query for the third web page, as indicated by arrow 768. Based on and/or in response to reception of the third query at arrow 768, service worker 710 may be configured to forward the third query to server application 700, as indicated by arrow 770.

Based on and/or in response to reception of the third query at arrow 770, server application 700 may be configured to generate a third response that includes (i) an updated shared programmatic content, (ii) a third page-specific programmatic content of the third web page, and (iii) an updated predefined token separating the updated shared programmatic content from the third page-specific programmatic content, as indicated by block 772. The updated predefined token may differ from a previous version of the predefined token, thereby indicating that the updated shared programmatic content differs from a previous version of the shared programmatic content. The updated shared programmatic content may represent, for example, a revised and/or updated version of the application framework.

Based on and/or in response to generating the third response at block 772, server application 700 may be configured to transmit, to client application 702, the third response, which may be received by service worker 710, as indicated by arrow 774. Based on and/or in response to reception of the third response, service worker 710 may be configured to determine that the third response contains the updated predefined token. Specifically, service worker 710 may be configured to determine that the updated predefined token differs from the predefined token received in connection with the first and second web pages, thereby indicating that the shared programmatic content has been updated.

Accordingly, based on and/or in response to determining that the third response contains the updated predefined token at block 776, service worker 710 may be configured to update the shared programmatic content stored in the cache memory using the updated shared programmatic content contained in the third response, as indicated by block 778. For example, the service worker 710 may be configured to overwrite the previous version of the shared programmatic content with the updated shared programmatic content, among other possibilities. Thus, future requests for a web page from the plurality of web pages that utilize the updated shared programmatic content may be at least partially satisfied using the cache memory, as illustrated in and discussed with respect to FIGS. 7B and 7C.

Additionally, based on and/or in response to determining that the third response contains the updated predefined token at block 776, service worker 710 may be configured to transmit, to network component 708 and/or renderer 706, an instruction to cancel any partial rendering of the previous version of the shared programmatic content, and instead render the third web page base on the third response. Thus, the third web page may be generated based on the updated shared programmatic content, rather than based on the now-stale previous version of the share programmatic content.

IX. Example Operations

Figure 8:
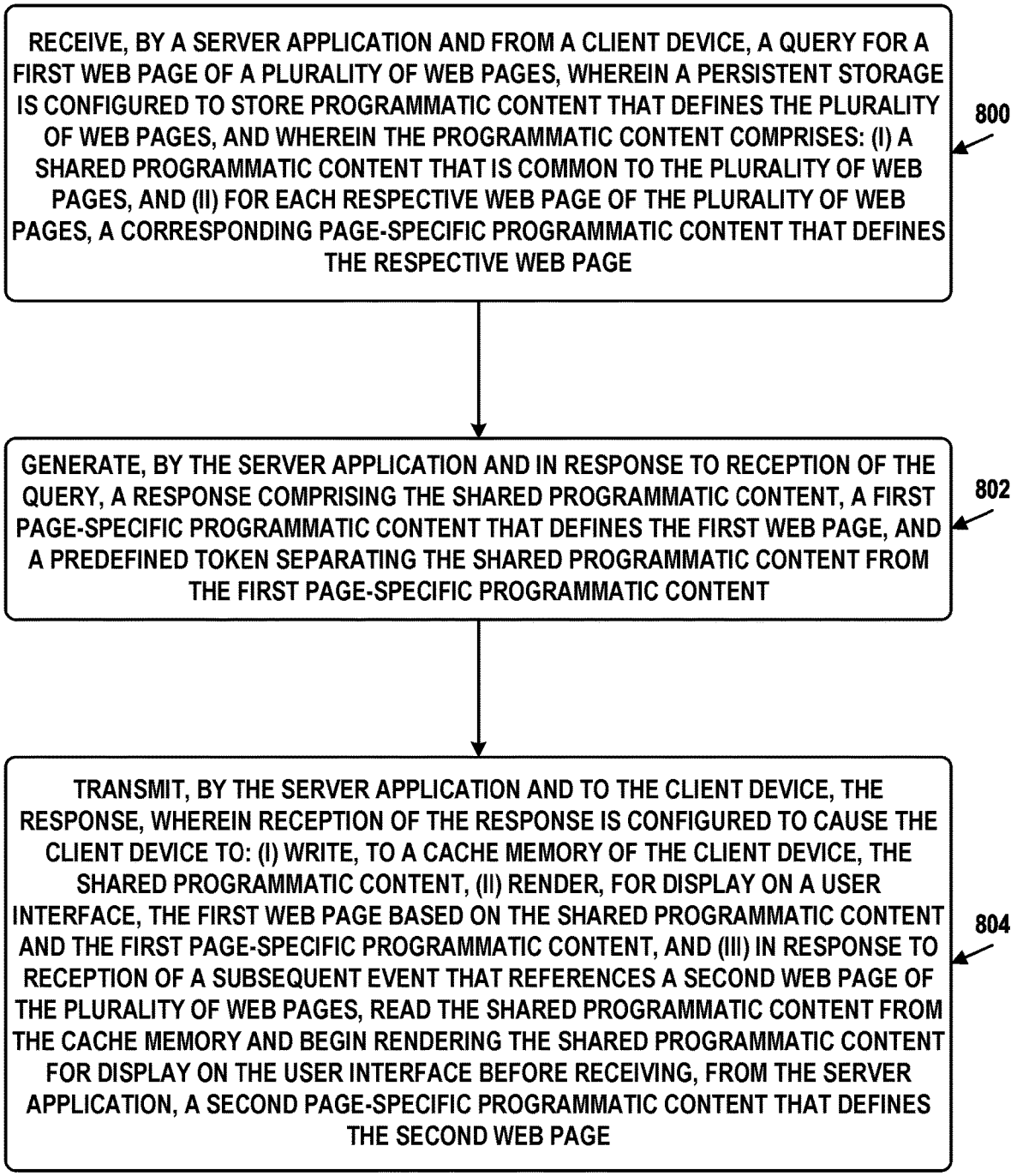
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by server device 600, server application 700, a computational instance of a remote network management platform, and/or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may include receiving, by a server application and from a client device, a query for a first web page of a plurality of web pages. A persistent storage may be configured to store programmatic content that defines the plurality of web pages. The programmatic content may include (i) a shared programmatic content that is common to the plurality of web pages, and (ii) for each respective web page of the plurality of web pages, a corresponding page-specific programmatic content that defines the respective web page.

Block 802 may include generating, by the server application and in response to reception of the query, a response that includes the shared programmatic content, a first page-specific programmatic content that defines the first web page, and a predefined token separating the shared programmatic content from the first page-specific programmatic content.

Block 804 may include transmitting, by the server application and to the client device, the response. Reception of the response may be configured to cause the client device to write, to a cache memory of the client device, the shared programmatic content. Reception of the response may be configured to also cause the client device to render, for display on a user interface, the first web page based on the shared programmatic content and the first page-specific programmatic content. Reception of the response may be configured to further cause the client device to, in response to reception of a subsequent event that references a second web page of the plurality of web pages, read the shared programmatic content from the cache memory and begin rendering the shared programmatic content for display on the user interface before receiving, from the server application, a second page-specific programmatic content that defines the second web page.

In some embodiments, the plurality of web pages may have been constructed using an application framework. The shared programmatic content may define the application framework, and the corresponding page-specific programmatic content may define the respective web page using the application framework.

In some embodiments, the server application may be configured to receive, from the client device, a second query for the second web page. The client device may be configured to transmit the second query to the server application in response to reception of the subsequent event. The server application may also be configured to generate, in response to reception of the second query, a second response that includes the shared programmatic content, the second page-specific programmatic content, and the predefined token separating the shared programmatic content from the second page-specific programmatic content. The server application may be further configured to transmit, to the client device, the second response. Reception of the second response may be configured to cause the client device to further render the second web page for display on the user interface based on (i) the shared programmatic content read from the cache memory and (ii) the second page-specific programmatic content contained in the second response.

In some embodiments, reception of the second response may be configured to cause the client device to further render the second web page for display on the user interface independently of the shared programmatic content contained in the second response.

In some embodiments, the server application may be configured to transmit, to the client device and before receiving the query for the first web page, initialization instructions configured to deploy, on a web browser application of the client device, a service worker. The service worker may be configured to (i) monitor communications between the web browser application and the server application and (ii), based on monitoring the communications, perform the writing to the cache memory and the reading from the cache memory of the shared programmatic content.

In some embodiments, reception of the response may be configured to cause the client device to identify the predefined token within the response, and write, to the cache memory of the client device, the shared programmatic content based on identifying the predefined token within the response.

In some embodiments, the server application may be configured to receive, from the client device, a third query for a third web page of the plurality of web pages. The server application may also be configured to generate, in response to reception of the third query, a third response that includes an updated shared programmatic content, a third page-specific programmatic content that defines the third web page, and an updated predefined token that is different from the predefined token and separates the updated shared programmatic content from the third page-specific programmatic content. The server application may be further configured to transmit, to the client device, the third response. Reception of the third response may be configured to cause the client device to: (i) determine that the third response contains the updated predefined token and (ii), based on determining that the third response contains the updated predefined token, update the shared programmatic content stored in the cache memory using the updated shared programmatic content.

In some embodiments, the plurality of web pages may have been constructed using an application framework. The updated shared programmatic content may define an updated version of the application framework, and the updated predefined token may be associated with the updated version of the application framework.

In some embodiments, reception of the response may be configured to cause the client device to, in response to reception of the subsequent event: (i) read the shared programmatic content from the cache memory and (ii) begin rendering the shared programmatic content after transmitting, to the server application, a second query for the second web page.

In some embodiments, reception of the response may be configured to cause the client device to, in response to reception of the subsequent event: (i) read the shared programmatic content from the cache memory using a first thread of the client device, and (ii) transmit, to the server application, a second query for the second web page using a second thread of the client device. The first thread and the second thread may be configured to execute in parallel.

In some embodiments, reception of the response may be configured to cause the client device to, in response to reception of the subsequent event, begin rendering the shared programmatic content for display on the user interface by: parsing the shared programmatic content, begin rendering of a user interface component defined by the shared programmatic content based on parsing the shared programmatic content, and displaying, by way of the user interface, a partial rendering of the user interface component prior to displaying a complete rendering of the user interface component based on the second page-specific programmatic content.

In some embodiments, reception of the response may be configured to cause the client device to, in response to reception of the subsequent event, read the shared programmatic content from the cache memory by: determining that the second web page is one of the plurality of web pages that uses the shared programmatic content and, based on determining that the second web page is one of the plurality of web pages that uses the shared programmatic content, read the shared programmatic content from the cache memory.

In some embodiments, determining that the second web page is one of the plurality of web pages that uses the shared programmatic content may include determining, based on the subsequent event, a uniform resource locator (URL) of the second web page and, based on the URL, determining that the second web page is one of the plurality of web pages that uses the shared programmatic content.

In some embodiments, determining that the second web page is one of the plurality of web pages that uses the shared programmatic content may include determining that a prior response received from the server application in response to a prior query for the second web page included the predefined token and, based on determining that the prior response included the predefined token, determining that the second web page is one of the plurality of web pages that uses the shared programmatic content.

In some embodiments, the shared programmatic content may include one or more of: (i) web page markup language content, (ii) style sheet language content, or (iii) a scripting language content.

Figure 9:
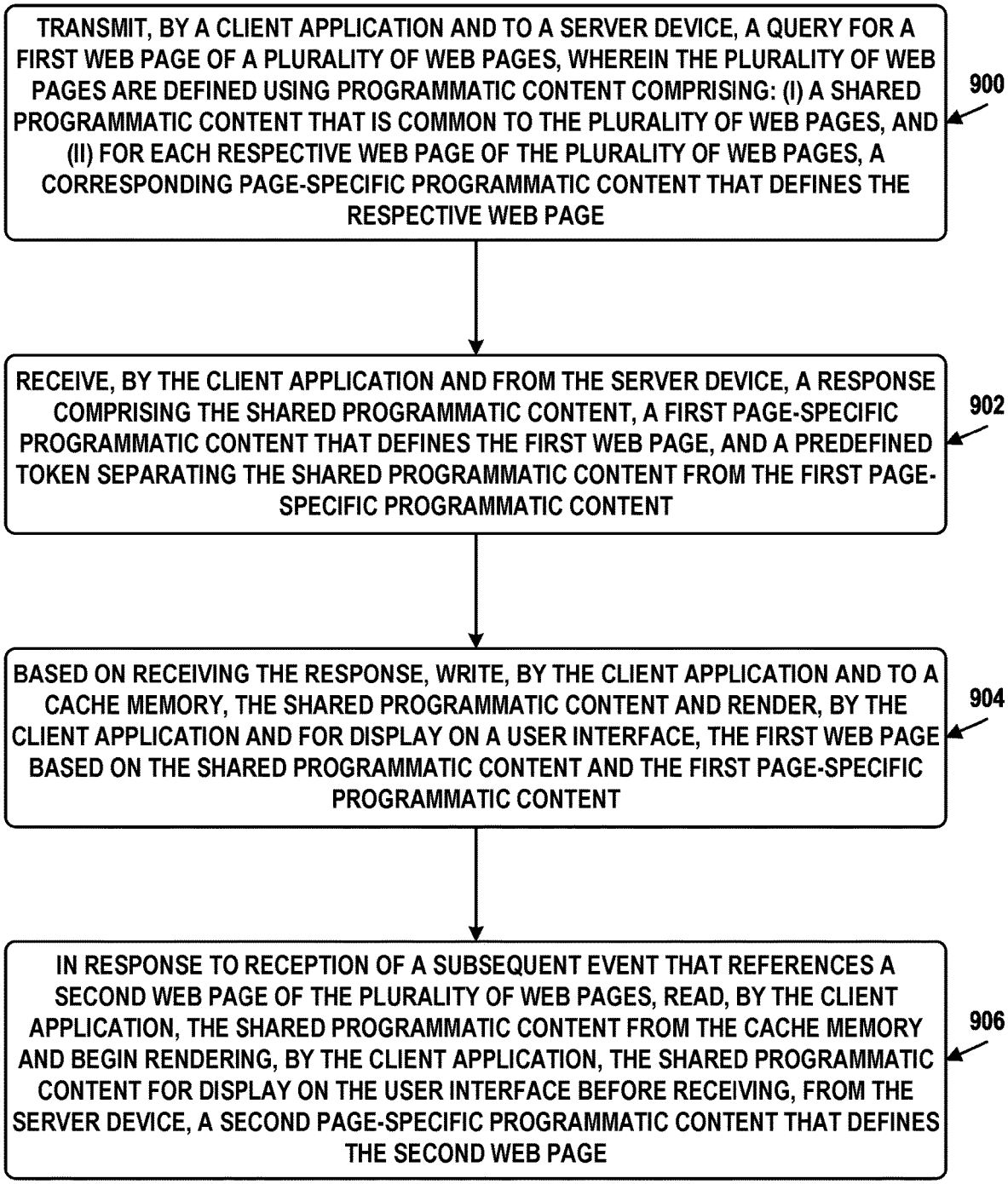
FIG. 9 is a flow chart, in accordance with example embodiments.

FIG. 9 is a flow chart illustrating an example embodiment. The process illustrated by FIG. 9 may be carried out by a computing device, such as computing device 100. However, the process can be carried out by other types of devices or device subsystems. For example, the process could be carried out by a client device executing client application 702, and/or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may include transmitting, by a client application and to a server device, a query for a first web page of a plurality of web pages. The plurality of web pages may be defined using programmatic content that includes: (i) a shared programmatic content that is common to the plurality of web pages, and (ii) for each respective web page of the plurality of web pages, a corresponding page-specific programmatic content that defines the respective web page.

Block 902 may include receiving, by the client application and from the server device, a response that includes the shared programmatic content, a first page-specific programmatic content that defines the first web page, and a predefined token separating the shared programmatic content from the first page-specific programmatic content.

Block 904 may include, based on receiving the response, writing, by the client application and to a cache memory, the shared programmatic content and rendering, by the client application and for display on a user interface, the first web page based on the shared programmatic content and the first page-specific programmatic content.

Block 906 may include, in response to reception of a subsequent event that references a second web page of the plurality of web pages, reading, by the client application, the shared programmatic content from the cache memory and beginning rendering, by the client application, the shared programmatic content for display on the user interface before receiving, from the server device, a second page-specific programmatic content that defines the second web page.

In some embodiments, the plurality of web pages may have been constructed using an application framework. The shared programmatic content may define the application framework, and the corresponding page-specific programmatic content may define the respective web page using the application framework.

In some embodiments, the client application may be configured to transmit, to the server device and in response to reception of the subsequent event, a second query for the second web page. The client application may also be configured to receive, from the server device, a second response that includes the shared programmatic content, the second page-specific programmatic content, and the predefined token separating the shared programmatic content from the second page-specific programmatic content. The client application may be further configured to, based on and/or in response to reception of the second response, render the second web page for display on the user interface based on (i) the shared programmatic content read from the cache memory and (ii) the second page-specific programmatic content contained in the second response.

In some embodiments, the client application may be configured to, based on and/or in response to reception of the second response, further render the second web page for display on the user interface independently of the shared programmatic content contained in the second response.

In some embodiments, the client application may be a web browser application. The web browser application may be configured to receive, from the server device and before transmitting the query for the first web page, initialization instructions configured to deploy, on the web browser application, a service worker. The service worker may be configured to (i) monitor communications between the web browser application and the server device and (ii), based on monitoring the communications, perform the writing to the cache memory and the reading from the cache memory of the shared programmatic content.

In some embodiments, the client application may be configured to, based on and/or in response to reception of the response, identify the predefined token within the response and write, to the cache memory, the shared programmatic content based on identifying the predefined token within the response.

In some embodiments, the client application may be configured to transmit, to the server device, a third query for a third web page of the plurality of web pages. The client application may also be configured to receive, from the server device, a third response that includes an updated shared programmatic content, a third page-specific programmatic content that defines the third web page, and an updated predefined token that is different from the predefined token and separates the updated shared programmatic content from the third page-specific programmatic content. The client application may be further configured to, based on and/or in response to reception of the third response: (i) determine that the third response contains the updated predefined token and (ii), based on determining that the third response contains the updated predefined token, update the shared programmatic content stored in the cache memory using the updated shared programmatic content.

In some embodiments, the plurality of web pages may have been constructed using an application framework. The updated shared programmatic content may define an updated version of the application framework, and the updated predefined token may be associated with the updated version of the application framework.

In some embodiments, the client application may be configured to, in response to reception of the subsequent event: (i) read the shared programmatic content from the cache memory and (ii) begin rendering the shared programmatic content after transmitting, to the server device, a second query for the second web page.

In some embodiments, the client application may be configured to, in response to reception of the subsequent event: (i) read the shared programmatic content from the cache memory using a first thread, and (ii) transmit, to the server device, a second query for the second web page using a second thread. The first thread and the second thread may be configured to execute in parallel.

In some embodiments, the client application may be configured to, in response to reception of the subsequent event, begin rendering the shared programmatic content for display on the user interface by: parsing the shared programmatic content, begin rendering of a user interface component defined by the shared programmatic content based on parsing the shared programmatic content, and displaying, by way of the user interface, a partial rendering of the user interface component prior to displaying a complete rendering of the user interface component based on the second page-specific programmatic content.

In some embodiments, the client application may be configured to, in response to reception of the subsequent event, read the shared programmatic content from the cache memory by: determining that the second web page is one of the plurality of web pages that uses the shared programmatic content and, based on determining that the second web page is one of the plurality of web pages that uses the shared programmatic content, read the shared programmatic content from the cache memory.

In some embodiments, determining that the second web page is one of the plurality of web pages that uses the shared programmatic content may include determining, based on the subsequent event, a URL of the second web page and, based on the URL, determining that the second web page is one of the plurality of web pages that uses the shared programmatic content.

In some embodiments, determining that the second web page is one of the plurality of web pages that uses the shared programmatic content may include determining that a prior response received from the server device in response to a prior query for the second web page included the predefined token and, based on determining that the prior response included the predefined token, determining that the second web page is one of the plurality of web pages that uses the shared programmatic content.

In some embodiments, the shared programmatic content may include one or more of: (i) web page markup language content, (ii) style sheet language content, or (iii) a scripting language content.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a persistent storage configured to store programmatic content that defines a plurality of web pages, wherein the programmatic content comprises: (i) a shared programmatic content that is common to the plurality of web pages, and (ii) for each respective web page of the plurality of web pages, a corresponding page-specific programmatic content that defines the respective web page;
   a processor; and
   a server application configured to perform, when executed by the processor, operations comprising:
     receiving, from a client device, a query for a first web page of the plurality of web pages;
     generating, in response to reception of the query, a response comprising the shared programmatic content, a first page-specific programmatic content that defines the first web page, and a predefined token located between the shared programmatic content and the first page-specific programmatic content to separate the shared programmatic content in the response from the first page-specific programmatic content in the response; and transmitting, to the client device, the response, wherein reception of the response is configured to cause the client device to:
(i) identify the predefined token within the response,
(ii) write, to a cache memory of the client device, the shared programmatic content based on identifying the predefined token within the response,
(iii) render, for display on a user interface, the first web page based on the shared programmatic content and the first page-specific programmatic content, and
(iv) in response to reception of a subsequent event that references a second web page of the plurality of web pages, read the shared programmatic content from the cache memory and begin rendering the shared programmatic content for display on the user interface before receiving from the server application a second page-specific programmatic content that defines the second web page.

2. The system of claim 1, wherein the plurality of web pages have been constructed using an application framework, wherein the shared programmatic content defines the application framework, and wherein the corresponding page-specific programmatic content defines the respective web page using the application framework.

3. The system of claim 1, wherein the operations further comprise:
receiving, from the client device, a second query for the second web page, wherein the client device is configured to transmit the second query to the server application in response to reception of the subsequent event;
generating, in response to reception of the second query, a second response comprising the shared programmatic content, the second page-specific programmatic content, and the predefined token located between the shared programmatic content and the second page-specific programmatic content to separate the shared programmatic content in the second response from the second page-specific programmatic content in the second response; and
transmitting, to the client device, the second response, wherein reception of the second response is configured to cause the client device to further render the second web page for display on the user interface based on (i) the shared programmatic content read from the cache memory and (ii) the second page-specific programmatic content contained in the second response.

4. The system of claim 3, wherein reception of the second response is configured to cause the client device to further render the second web page for display on the user interface independently of the shared programmatic content contained in the second response.

5. The system of claim 1, wherein the operations further comprise:
transmitting, to the client device and before receiving the query for the first web page, initialization instructions configured to deploy, on a web browser application of the client device, a service worker configured to (i) monitor communications between the web browser application and the server application and (ii), based on monitoring the communications, perform the writing to the cache memory and the reading from the cache memory of the shared programmatic content.

6. The system of claim 1, wherein the operations further comprise:
receiving, from the client device, a third query for a third web page of the plurality of web pages;
generating, in response to reception of the third query, a third response comprising an updated shared programmatic content, a third page-specific programmatic content that defines the third web page, and an updated predefined token that is different from the predefined token and separates the updated shared programmatic content from the third page-specific programmatic content; and
transmitting, to the client device, the third response, wherein reception of the third response is configured to cause the client device to: (i) determine that the third response contains the updated predefined token and (ii), based on determining that the third response contains the updated predefined token, update the shared programmatic content stored in the cache memory using the updated shared programmatic content.

7. The system of claim 6, wherein the plurality of web pages have been constructed using an application framework, wherein the updated shared programmatic content defines an updated version of the application framework, and wherein the updated predefined token is associated with the updated version of the application framework.

8. The system of claim 1, wherein reception of the response is configured to cause the client device to, in response to reception of the subsequent event: (i) read the shared programmatic content from the cache memory and (ii) begin rendering the shared programmatic content after transmitting, to the server application, a second query for the second web page.

9. The system of claim 1, wherein reception of the response is configured to cause the client device to, in response to reception of the subsequent event: (i) read the shared programmatic content from the cache memory using a first thread of the client device, and (ii) transmit, to the server application, a second query for the second web page using a second thread of the client device, and wherein the first thread and the second thread are configured to execute in parallel.

10. The system of claim 1, wherein reception of the response is configured to cause the client device to, in response to reception of the subsequent event, begin rendering the shared programmatic content for display on the user interface by:
parsing the shared programmatic content;
based on parsing the shared programmatic content, begin rendering of a user interface component defined by the shared programmatic content; and
displaying, by way of the user interface, a partial rendering of the user interface component prior to displaying a complete rendering of the user interface component based on the second page-specific programmatic content.

11. The system of claim 1, wherein reception of the response is configured to cause the client device to, in response to reception of the subsequent event, read the shared programmatic content from the cache memory by:
determining that the second web page is one of the plurality of web pages that uses the shared programmatic content; and based on determining that the second web page is one of the plurality of web pages that uses the shared programmatic content, read the shared programmatic content from the cache memory.

12. The system of claim 11, wherein determining that the second web page is one of the plurality of web pages that uses the shared programmatic content comprises:
determining, based on the subsequent event, a uniform resource locator (URL) of the second web page; and
based on the URL, determining that the second web page is one of the plurality of web pages that uses the shared programmatic content.

13. The system of claim 11, wherein determining that the second web page is one of the plurality of web pages that uses the shared programmatic content comprises:
determining that a prior response received from the server application in response to a prior query for the second web page included the predefined token; and
based on determining that the prior response included the predefined token, determining that the second web page is one of the plurality of web pages that uses the shared programmatic content.

14. The system of claim 1, wherein the shared programmatic content comprises one or more of: (i) web page markup language content, (ii) style sheet language content, or (iii) a scripting language content.

15. A computer-implemented method comprising:
receiving, by a server application and from a client device, a query for a first web page of a plurality of web pages, wherein a persistent storage is configured to store programmatic content that defines the plurality of web pages, and wherein the programmatic content comprises: (i) a shared programmatic content that is common to the plurality of web pages, and (ii) for each respective web page of the plurality of web pages, a corresponding page-specific programmatic content that defines the respective web page;
generating, by the server application and in response to reception of the query, a response comprising the shared programmatic content, a first page-specific programmatic content that defines the first web page, and a predefined token located between the shared programmatic content and the first page-specific programmatic content to separate the shared programmatic content in the response from the first page-specific programmatic content in the response; and
transmitting, by the server application and to the client device, the response, wherein reception of the response is configured to cause the client device to:
(i) identify the predefined token within the response,
(ii) write, to a cache memory of the client device, the shared programmatic content based on identifying the predefined token within the response,
(iii) render, for display on a user interface, the first web page based on the shared programmatic content and the first page-specific programmatic content, and
(iv) in response to reception of a subsequent event that references a second web page of the plurality of web pages, read the shared programmatic content from the cache memory and begin rendering the shared programmatic content for display on the user interface before receiving from the server application a second page-specific programmatic content that defines the second web page.

16. The computer-implements method of claim 15, wherein the plurality of web pages have been constructed using an application framework, wherein the shared programmatic content defines the application framework, and wherein the corresponding page-specific programmatic content defines the respective web page using the application framework.

17. The computer-implements method of claim 15, further comprising:
receiving, by the server application and from the client device, a second query for the second web page, wherein the client device is configured to transmit the second query to the server application in response to reception of the subsequent event;
generating, in response to reception of the second query, a second response comprising the shared programmatic content, the second page-specific programmatic content, and the predefined token located between the shared programmatic content and the second page-specific programmatic content to separate the shared programmatic content in the response from the second page-specific programmatic content in the response; and
transmitting, to the client device, the second response, wherein reception of the second response is configured to cause the client device to further render the second web page for display on the user interface based on (i) the shared programmatic content read from the cache memory and (ii) the second page-specific programmatic content contained in the second response.

18. The computer-implements method of claim 15, further comprising:
transmitting, to the client device and before receiving the query for the first web page, initialization instructions configured to deploy, on a web browser application of the client device, a service worker configured to (i) monitor communications between the web browser application and the server application and (ii), based on monitoring the communications, perform the writing to the cache memory and the reading from the cache memory of the shared programmatic content.

19. The computer-implements method of claim 15, further comprising:
receiving, from the client device, a third query for a third web page of the plurality of web pages;
generating, in response to reception of the third query, a third response comprising an updated shared programmatic content, a third page-specific programmatic content that defines the third web page, and an updated predefined token that is different from the predefined token and separates the updated shared programmatic content from the third page-specific programmatic content; and
transmitting, to the client device, the third response, wherein reception of the third response is configured to cause the client device to: (i) determine that the third response contains the updated predefined token and (ii), based on determining that the third response contains the updated predefined token, update the shared programmatic content stored in the cache memory using the updated shared programmatic content.

20. A system comprising:
a cache memory;
a processor; and
a client application configured to perform, when executed by the processor, operations comprising:
transmitting, to a server device, a query for a first web page of a plurality of web pages, wherein the plurality of web pages are defined using programmatic content comprising: (i) a shared programmatic content that is common to the plurality of web pages, and (ii) for each respective web page of the plurality of web pages, a corresponding page-specific programmatic content that defines the respective web page;

receiving, from the server device, a response comprising the shared programmatic content, a first page-specific programmatic content that defines the first web page, and a predefined token located between the shared programmatic content and the first page-specific programmatic content to separate the shared programmatic content in the response from the first page-specific programmatic content in the response;

based on receiving the response, identifying the predefined token within the response;

based on identifying the predefined token within the response, writing, to the cache memory, the shared programmatic content;

rendering, for display on a user interface, the first web page based on the shared programmatic content and the first page-specific programmatic content; and in response to reception of a subsequent event that references a second web page of the plurality of web pages, reading the shared programmatic content from the cache memory and beginning rendering the shared programmatic content for display on the user interface before receiving from the server device a second page-specific programmatic content that defines the second web page.

* * * * *